United States Patent
Streck

(10) Patent No.: US 6,565,115 B2
(45) Date of Patent: May 20, 2003

(54) INVISIBLE AIRBAG DOOR

(75) Inventor: Lilian Rene Streck, Waterford, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 20 days.

(21) Appl. No.: 09/949,189

(22) Filed: Sep. 7, 2001

(65) Prior Publication Data

US 2003/0047917 A1 Mar. 13, 2003

(51) Int. Cl.[7] ............................................... B60R 21/16
(52) U.S. Cl. ..................... 280/728.3; 280/732
(58) Field of Search ........................ 280/728.3, 732, 280/752, 728.2, 728.1; 180/90; 296/70

(56) References Cited

U.S. PATENT DOCUMENTS

| | | | |
|---|---|---|---|
| 4,895,389 A | | 1/1990 | Pack, Jr. |
| 5,403,033 A | | 4/1995 | Koma |
| 5,531,471 A | | 7/1996 | Terai |
| 5,564,731 A | | 10/1996 | Gallagher et al. |
| 5,564,733 A | | 10/1996 | Duenas et al. |
| 5,580,081 A | * | 12/1996 | Berg et al. ............... 280/728.3 |
| 5,810,388 A | | 9/1998 | Berardi et al. |
| 5,816,609 A | * | 10/1998 | Gray et al. .............. 280/728.3 |
| 5,863,062 A | * | 1/1999 | Harada et al. ........... 280/728.3 |
| 5,941,558 A | | 8/1999 | Labrie et al. |
| 5,997,030 A | * | 12/1999 | Hannert et al. ......... 280/728.3 |
| 6,070,901 A | | 6/2000 | Hazell et al. |
| 6,092,835 A | | 7/2000 | Thakore et al. ......... 280/728.3 |
| 6,109,645 A | * | 8/2000 | Totani et al. ............ 280/728.3 |
| 6,168,188 B1 | | 1/2001 | Preisler et al. |
| 6,457,739 B1 | * | 10/2002 | Dailey et al. ............ 280/728.3 |
| 6,460,876 B1 | * | 10/2002 | Nishijima ................ 280/728.3 |
| 6,485,047 B2 | * | 11/2002 | Belanger et al. ........ 280/728.2 |
| 2002/0005630 A1 | * | 1/2002 | Suzuki et al. ........... 280/728.3 |
| 2002/0043788 A1 | * | 4/2002 | Gallagher et al. ....... 280/728.3 |

FOREIGN PATENT DOCUMENTS

GB      2 322 341      8/1998

* cited by examiner

*Primary Examiner*—Paul N. Dickson
*Assistant Examiner*—David R. Dunn
(74) *Attorney, Agent, or Firm*—Brinks Hofer Gilson & Lione

(57) ABSTRACT

An instrument panel for an automobile comprises a substrate including an interior surface, an exterior surface, and an opening extending therethrough. A topper assembly is mounted to the exterior surface of the substrate over the opening and includes a pre-weakened outline formed therein defining a panel door which is aligned with the opening. The exterior surface of the substrate has a contoured shape which is adapted to receive an edge of the topper assembly to secure the topper assembly to the substrate.

11 Claims, 3 Drawing Sheets

INVISIBLE AIRBAG DOOR

TECHNICAL FIELD OF THE INVENTION

This patent discloses and claims a useful, novel, and unobvious invention for an automobile instrument panel, including an air bag device and a seamless outer cover.

BACKGROUND

One issue that has recently been a concern with air bag devices installed in automobiles is that the air bag must preserve the aesthetic appeal of the automobile, but at the same time, deploy outward through the instrument panel with minimal interference. The air bag must be able to break through the instrument panel, but the instrument panel itself must be structurally sound and resistant to inadvertent fracturing at or near the point where the air bag is meant to deploy. For this reason, there is a need in the industry for continuous improvement in an air bag door in an instrument panel.

SUMMARY OF THE INVENTION

In accordance with an aspect of the present invention, an instrument panel for an automobile comprises a substrate including an interior surface, an exterior surface, and an opening extending therethrough. A topper assembly is mounted to the exterior surface of the substrate over the opening and includes a pre-weakened outline formed therein defining a panel door which is aligned with the opening. The exterior surface of the substrate has a contoured shape which is adapted to receive an edge of the topper assembly to secure the topper assembly to the substrate.

In accordance with another aspect of the present invention, a method of supplying a modular topper assembly for a first and second vehicle includes the steps of providing a first substrate for the first vehicle and a second substrate for the second vehicle, providing a set of topper assemblies, and supplying the first substrate and a topper assembly for the first vehicle and supplying the second substrate and a topper assembly for the second vehicle.

DETAILED DESCRIPTION OF THE PREFERRED EMBODIMENT

Figure 1:
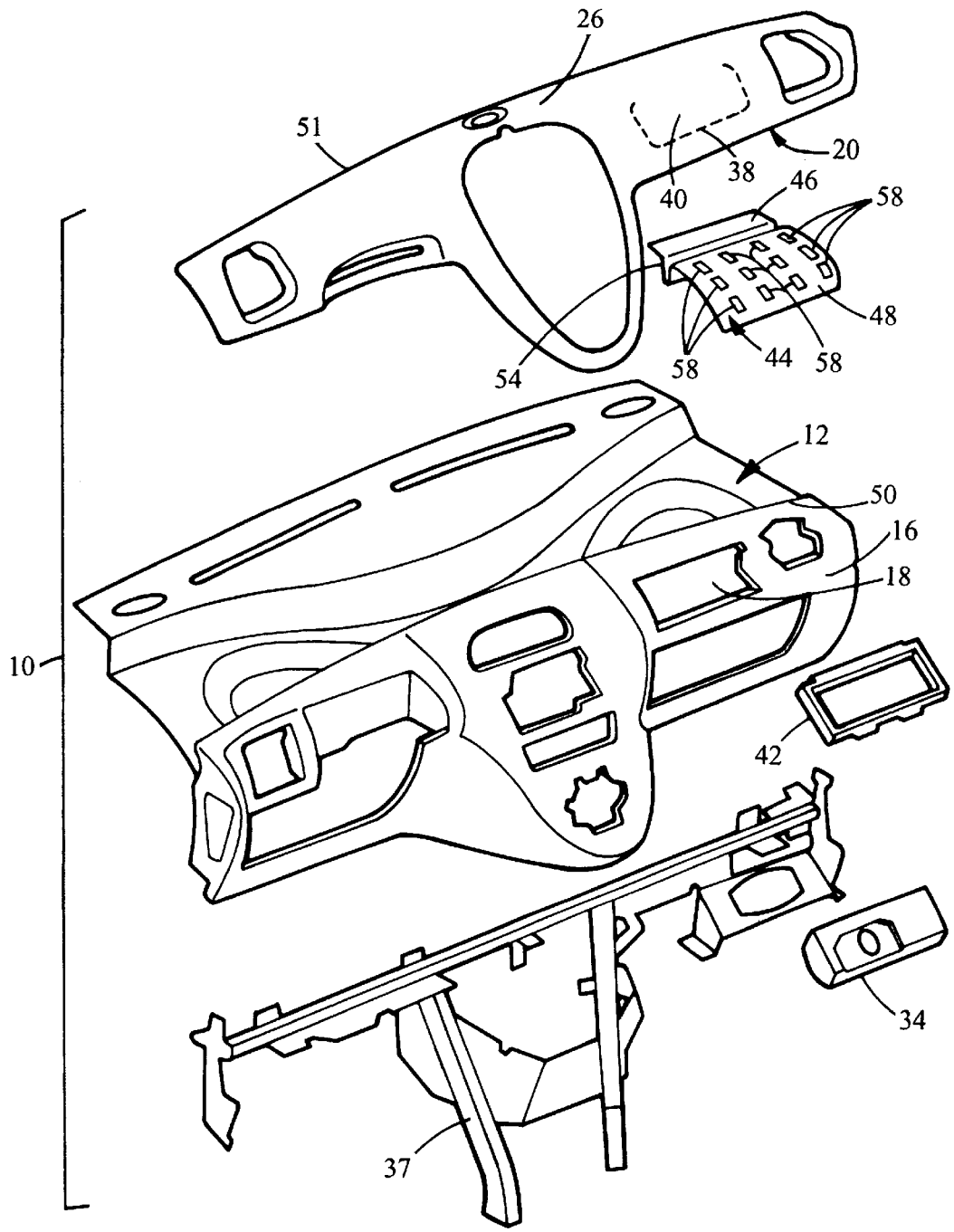
FIG. 1 is an exploded view of an instrument panel of the present invention shown with a first substrate.
Figure 2:
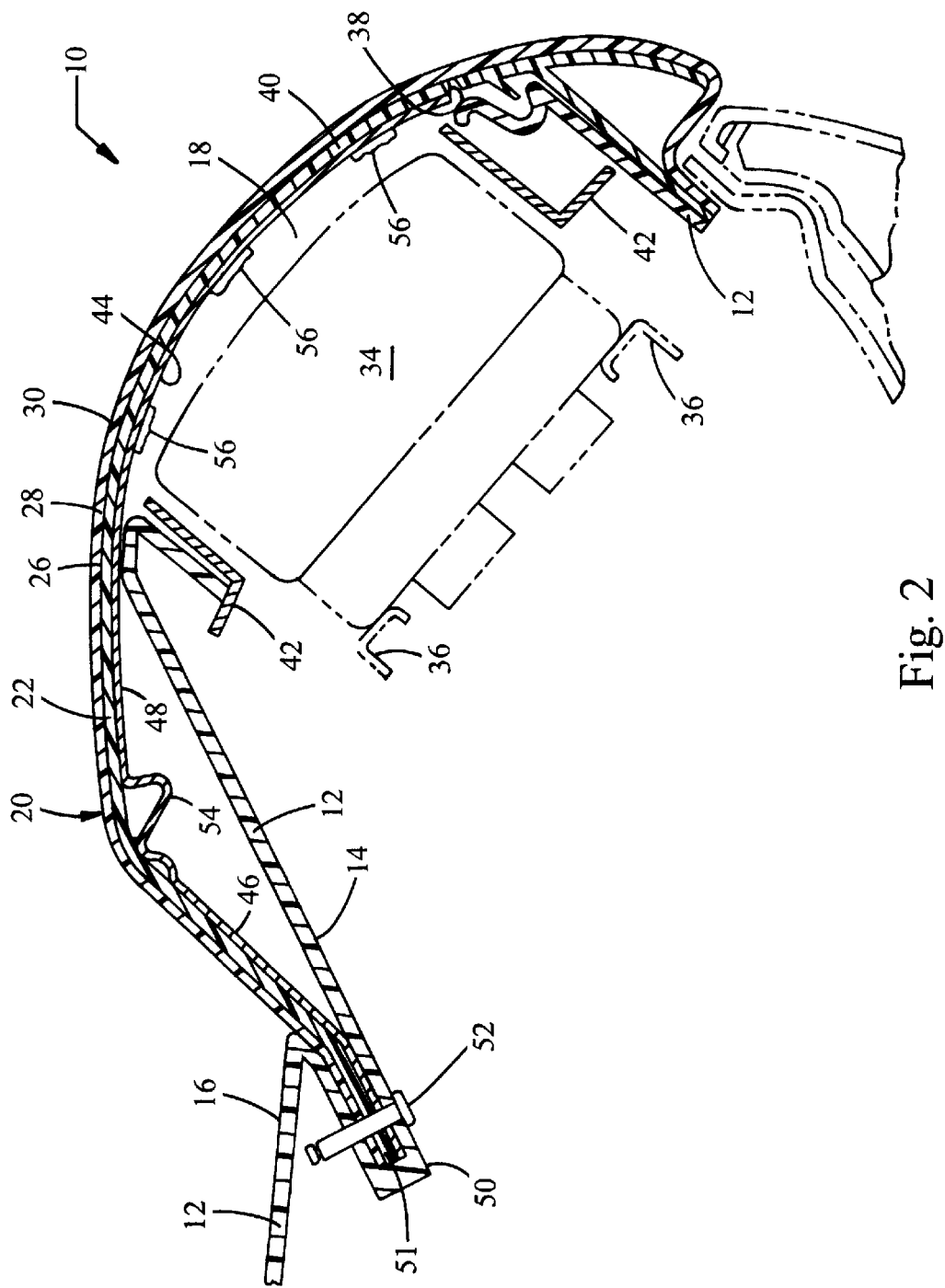
FIG. 2 is a cross sectional view of the instrument panel of FIG. 1.

The following description of the preferred embodiments of the invention is not intended to limit the scope of the invention to these preferred embodiments, but rather to enable any person skilled in the art to make and use the invention.

Referring to the Figures, an instrument panel for an automobile passenger compartment of the present invention is generally shown at 10. The instrument panel 10 includes a substrate 12 having an interior surface 14, an exterior surface 16, and an opening 18 formed therein. Preferably, the substrate 12 is formed from molded-in-color polypropylene, however it is to be understood that the substrate 12 could comprise other suitable materials.

A topper assembly 20 is mounted to the exterior surface 16 of the substrate 12. The topper assembly 20 includes a topper base 22 with an interior surface and an exterior surface 26. Preferably, the topper base 22 is formed from molded-in-color polypropylene, however it is to be understood that the topper base 22 could comprise other suitable materials. The interior surface of the topper base 22 is mounted to the exterior surface 16 of the substrate 12.

Preferably, the topper assembly 20 further includes a skin 28 that is adhesively bonded to the exterior surface 26 of the topper base 22. Preferably, the skin 28 comprises a thermoplastic olefin top skin 30 and a polypropylene foam and is vacuum formed over and adhesively bonded to the topper base 22. The thermoplastic olefin top skin 30 presents a cosmetically suitable appearance to the interior of the vehicle into which the instrument panel 10 is mounted.

An air bag module 34 is mounted to a support structure within the vehicle and is aligned with the opening 18 in the substrate 12. Preferably, the air bag module 34 includes a plurality of mounting brackets 36 which are adapted to mount the air bag module 34 to a support structure within the automobile. Preferably, the air bag module 34 is mounted directly to a cross car beam 37 within the vehicle behind the instrument panel 10.

A pre-weakened outline 38 is formed within the topper assembly 20 and defines a panel door 40 therein. Preferably, the pre-weakened outline 38 corresponds to the size and shape of the opening 18 within the substrate 12. The pre-weakened outline 38 allows the topper assembly 20 to maintain structural integrity and appearance while providing a weakened outline that will break away under the pressure of a deploying air bag. When an air bag is deployed from the air bag module 34, the force is sufficient to break the panel door 40 away from the remaining portion of the topper assembly 20 along the pre-weakened outline 38. Preferably, the pre-weakened outline 38 extends in a generally four-sided rectangular pattern to define the periphery of the panel door 40. It is to be understood that the shape of the panel door 40 could be any suitable shape for the particular application.

The pre-weakened outline 38 within the topper assembly 20 can be formed by any known methods, however, in the preferred embodiment, the pre-weakened outline 38 is formed by laser scoring the interior surface 24 of the topper base 22. By appropriately selecting and controlling the laser, a cut can be made within the topper assembly 20 which extends through the topper base 22 and into the skin 28. Preferably, the cut is deep enough to weaken the skin 28, but not deep enough to compromise the structural integrity of the skin 28 under normal operating conditions. Additionally, the cut preferably does not provide any visible indication on the exterior surface of the top skin 30 that the pre-weakened outline 38 is present.

A chute 42 is mounted to the interior surface 14 of the substrate 12. The chute 42 is adapted to direct the deployment of the air bag from the air bag module 34 through the opening 18. Preferably, the chute 42 is made from metal, however it is to be understood that the chute 42 could also be molded from a plastic material or formed from other suitable materials.

Figure 3:
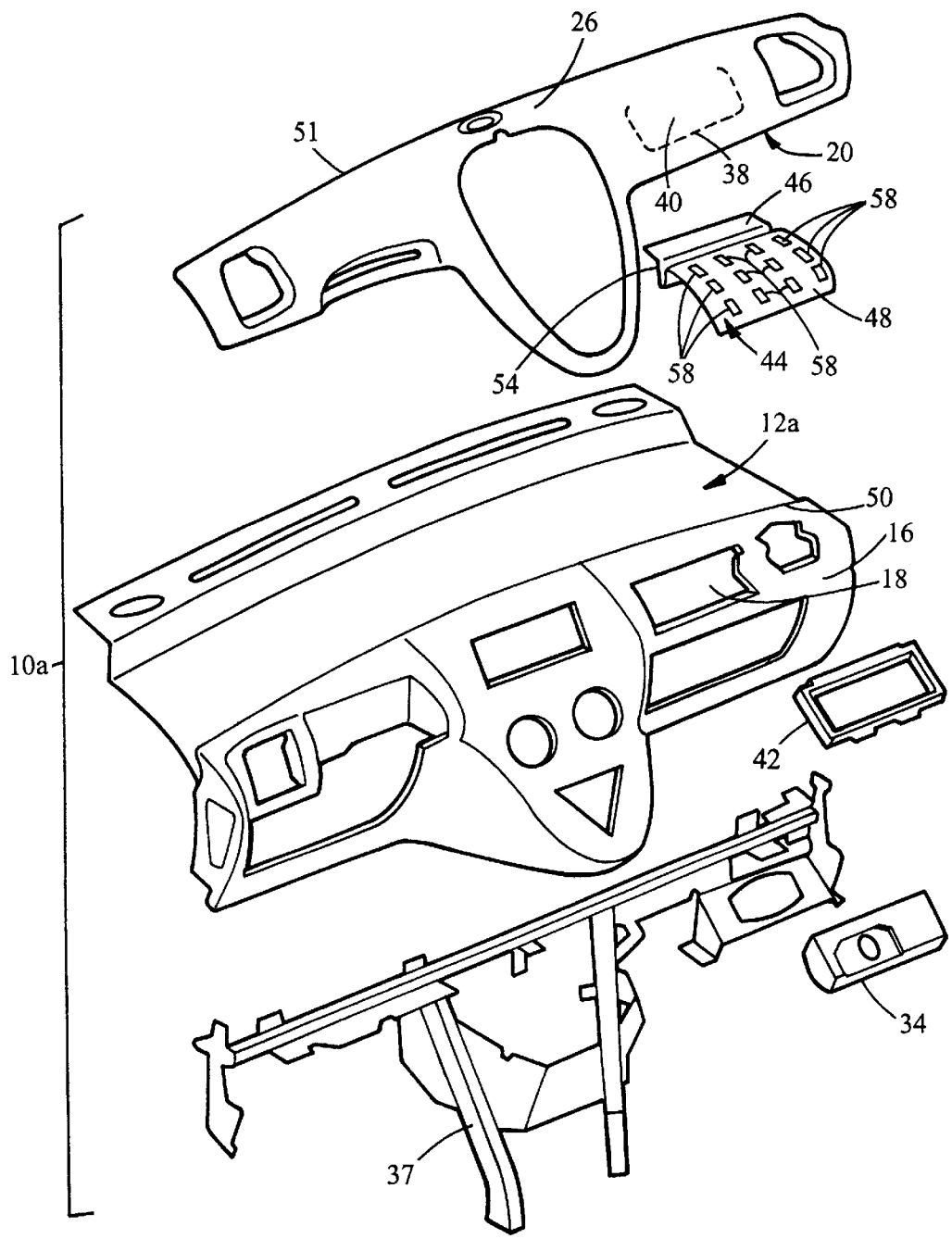
FIG. 3 is an exploded view of an instrument panel of the present invention with a second substrate.

A support door 44 is mounted to the substrate 12. The support door 44 includes a hinge portion 46 and a door portion 48. The hinge portion 46 is attached to the substrate 12. The exterior surface 16 of the substrate 12 includes a contoured shape that is adapted to receive the topper assembly 20 to secure the topper assembly 20 to the substrate 12. Preferably, the substrate 12 includes a pocket 50 adapted to receive an edge 51 of the topper assembly 20 and the hinge portion 46 of the support door 44. Preferably, multiple substrates 12 that are designed for different instrument panels 10 will include identical pockets, so that the topper assembly 20 can be modular and be used on different instrument panel substrates 12 with different features. Referring to FIGS. 1 and 3, FIG. 1 illustrates an instrument panel 10 with a first substrate 12, and FIG. 3 illustrates an instrument panel 10a with a second substrate 12a. Each of the substrates 12, 12a includes identical pockets 50 such that the same topper assembly 20 can be mounted to either substrate 12, 12a. In this manner, a modular topper assembly for a first vehicle instrument panel having a first substrate and for a second vehicle instrument panel having a second substrate can be provided. The topper assembly 20 and the hinge portion 46 of the support door 44 are secured within the pocket 50, preferably by mechanical fasteners 52, although other means of securing the topper assembly 20 and the hinge portion 46 of the support door 44 can be employed.

Preferably, the door portion 48 is pivotally attached to the hinge portion 46, and is further attached to the panel door 40. The door portion 48 can be attached to the hinge portion 46 by any pivotal means, however, in the preferred embodiment, the hinge portion 46 and the door portion 48 are formed from a single piece of stamped metal, preferably aluminum. When the door portion 48 pivots from a closed position to an open position, the single stamped piece of aluminum bends at a point between the hinge portion 46 and the door portion 48. Preferably, the single piece stamping includes a contour lip 54 between the door portion 48 and the hinge portion 46 to provide a pre-determined crease line to allow proper pivotal movement of the door portion 48 in relation to the substrate 12.

The door portion 48 of the support door 44 is further attached to the panel door 40. Preferably, the portion of the interior surface 24 of the topper base 22 which forms the panel door 40 includes a plurality of molded in ribs 56. The door portion 48 of the support door 44 includes a corresponding plurality of apertures 58. The apertures 58 are adapted to receive the molded in ribs 56 to allow the door portion 48 of the support door 44 to be heat staked to the panel door 40. In this way, the support door 44 provides a hinge for the panel door 40. The support door 44 is preferably made from metal, however it is to be understood that other appropriate materials such as carbon fiber, or polymeric materials could be employed.

The foregoing discussion discloses and describes one preferred embodiment and one preferred method of the present invention. One skilled in the art will readily recognize from such discussion, and from the accompanying drawings and claims, that changes and modifications can be made to the invention without departing from the true spirit and fair scope of the invention as defined in the following claims. The invention has been described in an illustrative manner, and it is to be understood that the terminology which has been used is intended to be in the nature of words of description rather than of limitation.

What is claimed is:

1. An instrument panel for an automobile comprising:
   a substrate including an interior surface, an exterior surface, and an opening therein;
   a topper assembly mounted to said exterior surface of said substrate over said opening and including a pre-weakened outline formed therein defining a panel door aligned with said opening; and
   a support door including a hinge portion and a door portion; said door portion pivotally attached to said hinge portion and further attached to said panel door to strengthen said panel door and to provide a hinge for said panel door;
   said exterior surface of said substrate having a contoured shape adapted to receive an edge of said topper assembly to secure said topper assembly to said substrate and to receive said hinge portion of said support door to secure said hinge portion to said substrate;
   said topper assembly including molded-in ribs and said support door including apertures adapted to receive said molded-in ribs to allow said support door to be heat staked to said panel door.

2. The instrument panel as set forth in claim 1 further including a chute mounted to said interior surface of said substrate and adapted to direct the deployment of an air bag through said opening and an air bag module mounted to a support structure within the automobile and aligned with said chute, wherein said air bag module includes a plurality of mounting brackets adapted to mount said air bag module to the support structure within the automobile.

3. The instrument panel as set forth in claim 1 wherein said topper assembly includes a topper base and a skin, said skin being adhesively bonded onto said topper base.

4. The instrument panel as set forth in claim 3 wherein said skin comprises a thermoplastic olefin top skin and a polypropylene foam and is vacuum formed over and adhesively bonded to said topper base.

5. The instrument panel as set forth in claim 3 wherein said pre-weakened outline within said topper assembly is a laser scored line that extends through said topper base and partially through said skin.

6. The instrument panel as set forth in claim 1 wherein said substrate and said topper base are injection molded from molded-in-color polypropylene.

7. The instrument panel as set forth in claim 1 wherein said contoured exterior surface defines a pocket, said pocket being adapted to receive said edge of said topper assembly and said hinge portion of said support door to secure said topper assembly and said support door to said substrate.

8. The instrument panel as set forth in claim 7 wherein said edge of said topper assembly and said hinge portion of said support door are secured within said pocket by a mechanical fastener.

9. A modular topper assembly adapted to be mounted onto one of a plurality of instrument panel substrates comprising:

a topper base and a skin adhesively bonded thereon;

a pre-weakened outline defining a panel door;

an edge portion adapted to be secured to any one of the plurality of substrates with mechanical fasteners; and a support door including a hinge portion and a door portion, said hinge portion adapted to be secured to any one of the plurality of substrates and said door portion pivotally attached to said hinge portion;

said topper base including molded-in ribs and said support door including apertures adapted to receive said molded-in ribs to allow said support door to be heat staked to said panel door, said support door adapted to strengthen said panel door and to provide a hinge for said panel door.

10. The modular topper assembly of claim 9 wherein said topper base is molded from molded-in-color polypropelyne, and said skin comprises a thermoplastic olefin top skin and a polypropylene foam that is vacuum formed over and adhesively bonded to said topper base.

11. The modular topper assembly of claim 10 wherein said pre-weakened outline within said topper assembly is a laser scored line that extends through said topper base and partially through said skin.

* * * * *